United States Patent
Zhang et al.

(10) Patent No.: US 10,819,745 B2
(45) Date of Patent: Oct. 27, 2020

(54) URL ABNORMALITY POSITIONING METHOD AND DEVICE, AND SERVER AND STORAGE MEDIUM

(71) Applicant: ALIBABA GROUP HOLDING LIMITED, Grand Cayman (KY)

(72) Inventors: Yalin Zhang, Hangzhou (CN); Longfei Li, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/878,521

(22) Filed: May 19, 2020

(65) Prior Publication Data
US 2020/0280583 A1   Sep. 3, 2020

Related U.S. Application Data

(63) Continuation of application No. PCT/CN2019/073629, filed on Jan. 29, 2019.

(30) Foreign Application Priority Data

Mar. 6, 2018   (CN) .......................... 2018 1 0182571

(51) Int. Cl.
*H04L 29/06* (2006.01)
*G06F 16/955* (2019.01)
*G06N 20/00* (2019.01)

(52) U.S. Cl.
CPC ...... *H04L 63/1483* (2013.01); *G06F 16/9566* (2019.01); *G06N 20/00* (2019.01); *H04L 63/1416* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 9,043,897 B2 * | 5/2015 | Newman | G06Q 20/401 726/15 |
| 10,079,876 B1 * | 9/2018 | Chung | H04L 67/02 |

(Continued)

FOREIGN PATENT DOCUMENTS

| CN | 101702660 B | 12/2011 |
|---|---|---|
| CN | 106055574 A | 10/2016 |

(Continued)

OTHER PUBLICATIONS

First Search for Chinese Application No. 201810182571.X dated Apr. 25, 2019.

(Continued)

*Primary Examiner* — Henry Tsang

(57) ABSTRACT

Embodiments of the specification provide a URL abnormal field location method. One exemplary method comprising: obtaining a plurality of URL samples comprising a plurality of abnormal URL samples and a plurality of normal URL samples; for each of the plurality of URL samples, obtaining a plurality of feature vectors representing the plurality of fields of the URL sample; assigning a plurality of training labels to the plurality of feature vectors of each of the plurality of URL samples; obtaining, based on a classifier, a plurality of predicted labels for the plurality of feature vectors of each of the plurality of URL samples; updating the plurality of training labels based on the plurality of predicted labels; training the classifier with the plurality of updated training labels; and deploying the trained classifier to identify an abnormal field in a URL.

20 Claims, 4 Drawing Sheets

(56) References Cited

U.S. PATENT DOCUMENTS

| | | | | |
|---|---|---|---|---|
| 2009/0094175 | A1* | 4/2009 | Provos | G06F 21/577 |
| | | | | 706/12 |
| 2014/0137251 | A1 | 5/2014 | Lee et al. | |
| 2017/0169360 | A1* | 6/2017 | Veeramachaneni | |
| | | | | G06N 3/0454 |
| 2017/0295187 | A1* | 10/2017 | Havelka | H04L 63/1441 |
| 2017/0372071 | A1* | 12/2017 | Saxe | G06F 21/562 |
| 2020/0195667 | A1 | 6/2020 | Li | |

FOREIGN PATENT DOCUMENTS

| | | |
|---|---|---|
| CN | 106131071 A | 11/2016 |
| CN | 107577945 A | 1/2018 |
| CN | 107992741 A | 5/2018 |
| CN | 108111489 A | 6/2018 |
| CN | 108229156 A | 6/2018 |
| CN | 108366071 A | 8/2018 |

OTHER PUBLICATIONS

First Office Action for Chinese Application No. 201810182571.X dated May 7, 2019. X.
Supplementary Search for Chinese Application No. 201810182571.X dated Nov. 22, 2019.
Second Office Action for Chinese Application No. 201810182571.X dated Dec. 3, 2019.
Third Office Action for Chinese Application No. 201810182571.X dated Mar. 31, 2020.
Supplementary Search for Chinese Application No. 201810182571.X dated May 5, 2020.
Search Report for Taiwanese Application No. 107147125 dated Nov. 5, 2019.
Written Opinion and International Search Report for International Application No. PCT/CN2019/073629 dated Apr. 18, 2019.

\* cited by examiner

URL ABNORMALITY POSITIONING METHOD AND DEVICE, AND SERVER AND STORAGE MEDIUM

CROSS-REFERENCE TO RELATED APPLICATIONS

This application is a continuation application of International Patent Application No. PCT/CN2019/073629, filed on Jan. 29, 2019, which claims priority to Chinese Patent Application No. 201810182571.X, entitled "URL ABNORMALITY POSITIONING METHOD AND DEVICE, AND SERVER AND STORAGE MEDIUM" filed on Mar. 6, 2018. The entire content of the above referenced applications are incorporated herein by reference.

TECHNICAL FIELD

Embodiments of the specification relate to the field of Internet technologies, and in particular, to a URL abnormal field location method and device, and a server and storage medium.

BACKGROUND

In an application scenario of the Internet, there are a large number of accesses to a URL (Uniform Resource Locator) every day. In this case, some lawbreakers attempt to perform an attack through an illegal URL access.

SUMMARY

Embodiments of the specification provide a URL abnormal field location method and device, and a server and storage medium.

In a first aspect, an embodiment of the specification provides a URL abnormal field location method, including: obtaining a plurality of URL samples comprising a plurality of abnormal URL samples and a plurality of normal URL samples, wherein each of the plurality of URL samples comprises a plurality of fields; for each of the plurality of URL samples, obtaining a plurality of feature vectors representing the plurality of fields of the URL sample; assigning a plurality of training labels to the plurality of feature vectors of each of the plurality of URL samples by: for each of the plurality of the abnormal URL samples, randomly selecting one or more of the plurality of feature vectors of the abnormal URL sample and assigning one or more positive training labels respectively to the one or more selected feature vectors; for each of the plurality of the normal URL samples, assigning a plurality of negative training labels respectively to the plurality of feature vectors of the normal URL sample; and obtaining, based on a classifier, a plurality of predicted labels for the plurality of feature vectors of each of the plurality of URL samples; updating the plurality of training labels based on the plurality of predicted labels; training the classifier with the plurality of updated training labels; and deploying the trained classifier to identify an abnormal field in a URL.

In some embodiments, the randomly selecting one or more of the plurality of feature vectors of the abnormal URL sample and assigning one or more positive training labels respectively to the one or more selected feature vectors comprises: assigning a negative training label to each of the plurality of feature vectors that are not selected.

In some embodiments, each of the plurality of feature vectors comprises at least one of following features of the corresponding field: a total number of characters, a total number of alphabets, a total number of digits, and a total number of symbols.

In some embodiments, the updating the plurality of training labels based on the plurality of predicted labels comprises: keeping the plurality of training labels for each of the plurality of normal URL samples unchanged; and updating the plurality of training labels for each of the plurality of abnormal URL samples according to the plurality of predicted labels for the abnormal URL sample.

In some embodiments, the obtaining a plurality of predicted labels for the plurality of feature vectors of each of the plurality of URL samples based on a classifier comprises: by classifying each of the plurality of feature vectors of the URL sample, the classifier generates the plurality of predicted labels for the plurality of feature vectors and a plurality of corresponding scores, each score indicating a probability of a corresponding classification; and the updating the plurality of training labels based on the plurality of predicted labels comprises: in response to the plurality of predicted labels for the abnormal URL sample being all negative, selecting one of the plurality of vector features of the abnormal URL sample corresponding to the predicted label with a lowest score; and updating the plurality of training labels for the abnormal URL sample by assigning a positive training label to the selected vector feature of the abnormal URL sample.

In some embodiments, the training the classifier with the plurality of updated training labels comprises: training the classifier until the plurality of training labels are unchanged after being updated based on the plurality of predicted labels.

In some embodiments, the training the classifier with the plurality of updated training labels comprises: training the classifier based on a multiple-instance learning algorithm.

In some embodiments, the deploying the trained classifier to identify an abnormal field in a URL comprises: obtaining a plurality of feature vectors corresponding to a plurality of fields in the URL; inputting the plurality of feature vectors into classifier to predict a plurality of labels for the plurality of fields in the URL; and locating one or more abnormal fields in the URL according to the plurality of abnormality labels for the URL.

In some embodiments, the plurality of fields of the URL sample comprise a parameter request field in the URL sample.

In a second aspect, an embodiment of the specification provides a system for locating a URL abnormal field. The system comprises a processor and a non-transitory computer-readable storage medium storing instructions executable by the processor to cause the system to perform operations comprising: obtaining a plurality of URL samples comprising a plurality of abnormal URL samples and a plurality of normal URL samples, wherein each of the plurality of URL samples comprises a plurality of fields; for each of the plurality of URL samples, obtaining a plurality of feature vectors representing the plurality of fields of the URL sample; assigning a plurality of training labels to the plurality of feature vectors of each of the plurality of URL samples by: for each of the plurality of the abnormal URL samples, randomly selecting one or more of the plurality of feature vectors of the abnormal URL sample and assigning one or more positive training labels respectively to the one or more selected feature vectors; for each of the plurality of the normal URL samples, assigning a plurality of negative training labels respectively to the plurality of feature vectors of the normal URL sample; and obtaining, based on a classifier, a plurality of predicted labels for the plurality of feature vectors of each of the plurality of URL samples; updating the plurality of training labels based on the plurality of predicted labels; training the classifier with the plurality of updated training labels; and deploying the trained classifier to identify an abnormal field in a URL.

In a third aspect, an embodiment of the specification provides a non-transitory computer-readable storage medium. The storage medium may be configured with instructions executable by one or more processors to cause the one or more processors to perform operations comprising: obtaining a plurality of URL samples comprising a plurality of abnormal URL samples and a plurality of normal URL samples, wherein each of the plurality of URL samples comprises a plurality of fields; for each of the plurality of URL samples, obtaining a plurality of feature vectors representing the plurality of fields of the URL sample; assigning a plurality of training labels to the plurality of feature vectors of each of the plurality of URL samples by: for each of the plurality of the abnormal URL samples, randomly selecting one or more of the plurality of feature vectors of the abnormal URL sample and assigning one or more positive training labels respectively to the one or more selected feature vectors; for each of the plurality of the normal URL samples, assigning a plurality of negative training labels respectively to the plurality of feature vectors of the normal URL sample; and obtaining, based on a classifier, a plurality of predicted labels for the plurality of feature vectors of each of the plurality of URL samples; updating the plurality of training labels based on the plurality of predicted labels; training the classifier with the plurality of updated training labels; and deploying the trained classifier to identify an abnormal field in a URL.

The embodiments of the specification have beneficial effects below:

In some embodiments, when the URL is represented as a bag consisting of a plurality of instances corresponding to a plurality of fields, an abnormal instance is predicted by using a URL abnormal field location model, so as to locate an abnormal field in the URL. By multiple-instance learning-based URL abnormal field location, an undiscovered potential threat in data accessed every day can be well predicted. Because an abnormality may be determined for an abnormal URL, a great support may be provided for discovering the potential threat, building a new security rule, and establishing a security system.

DETAILED DESCRIPTION OF THE INVENTION

To better understand the above technical solutions, the technical solutions of the embodiments of the specification will be described in detail below with reference to the accompanying drawings and specific embodiments. It should be understood that the embodiments of the specification and specific features in the embodiments are detailed descriptions of the technical solutions of the embodiments of the specification and are not intended to limit the technical solutions of the specification. The embodiments of the specification and the technical features in the embodiments may be combined with each other without conflict.

Figure 1:
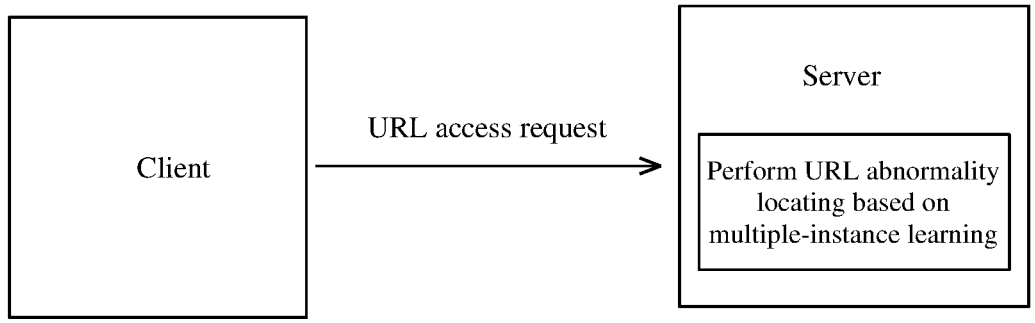
FIG. 1 is a schematic diagram of a URL abnormal field location scenario, according to an embodiment of the specification.

FIG. 1 is a schematic diagram of a URL abnormal field location scenario according to an embodiment of the specification. A client (user side) makes a URL access request to a server (network side). The server parses the URL access request to obtain a URL, and performs multiple-instance learning-based URL abnormal field location. In particular, the server trains a URL abnormal field location model based on a multiple-instance learning algorithm in advance, predicts an abnormal instance through the URL abnormal field location model, and then determines a field at which a corresponding URL is located, so as to locate URL abnormality. In the embodiments of the specification, the so-called "URL abnormal field location" is different from determination whether the entire URL is abnormal or not. Instead, the position of a specific abnormal field in the URL is determined, to facilitate more accurate analysis and precaution of an abnormality.

In some embodiments, "abnormal" may indicate "potentially malicious" or "potentially risky," and "normal" may indicate "likely benign." For example, an abnormal URL may refer to a malicious URL, an abnormal URL field (a portion of the URL) may refer to a malicious URL field. In some embodiments, "abnormality" may refer to "anomaly."

In a first aspect, an embodiment of the specification provides a URL abnormal field location method.

Figure 2:
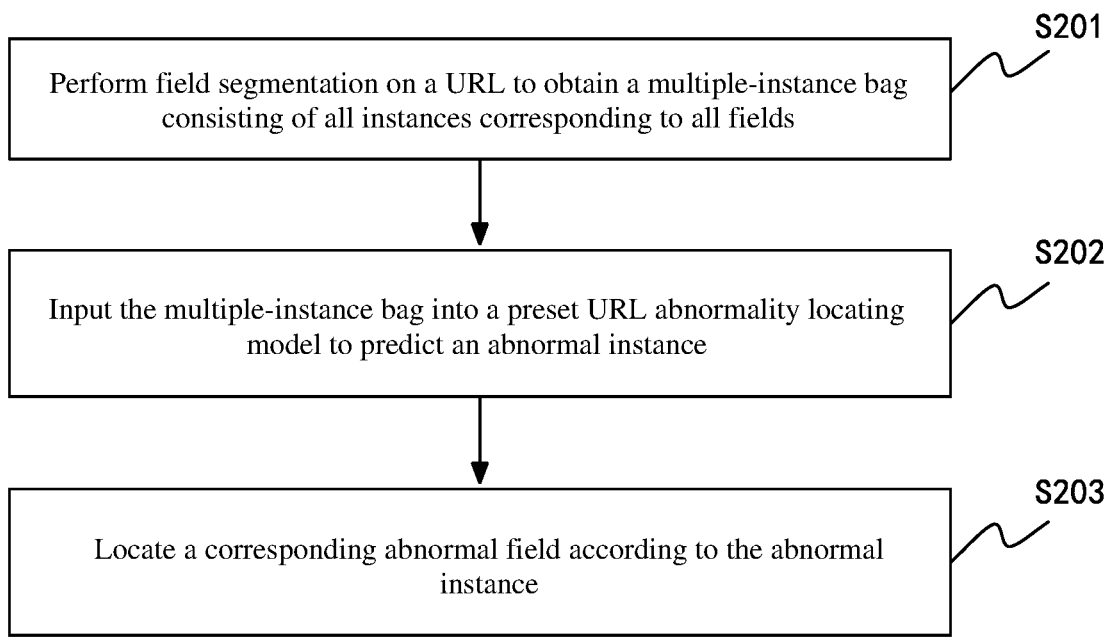
FIG. 2 is a flowchart of a URL abnormal field location method, according to a first aspect of an embodiment of the specification.

Referring to FIG. 2, a URL abnormal field location method according to an embodiment of the specification includes step S201 to step S203 below.

S201. Perform field segmentation on a URL to obtain a multiple-instance bag consisting of all instances corresponding to all fields.

Based on multiple-instance learning (MIL), the URL is segmented to obtain a bag consisting of a plurality of instances. Different from a traditional supervised learning, in the multiple-instance learning, data is given in a form of bags. One bag usually has a plurality of instances. It may be understood that each URL in the embodiments of the specification corresponds to a bag. The bag includes a plurality of instances. Therefore, a "multiple-instance bag" represents one URL.

A basic URL includes a model (or protocol), a server name (or IP address), a path, and a file name, such as "protocol://authorization/path?Query." A complete syntax of a common uniform resource identifier with an authorization part may be shown below: Protocol://username: password@subdomain.domain name top-level domain: port number/directory/file name file suffix? parameter=value # flag. In some embodiments, field segmentation may be performed on the entire URL structure, or only a high-risk field may be segmented.

For example, only a server name field is further segmented into a plurality of instances; or a part after the # (pound sign) is segmented to obtain a plurality of instances.

The instances may be represented by feature vectors of corresponding fields. For example, a pattern, a number of characters, and a number of letters of a field are represented as the feature vectors, to obtain instances corresponding to the field.

S202. Input the multiple-instance bag into a preset URL abnormal field location model to predict an abnormal instance.

Figure 3:
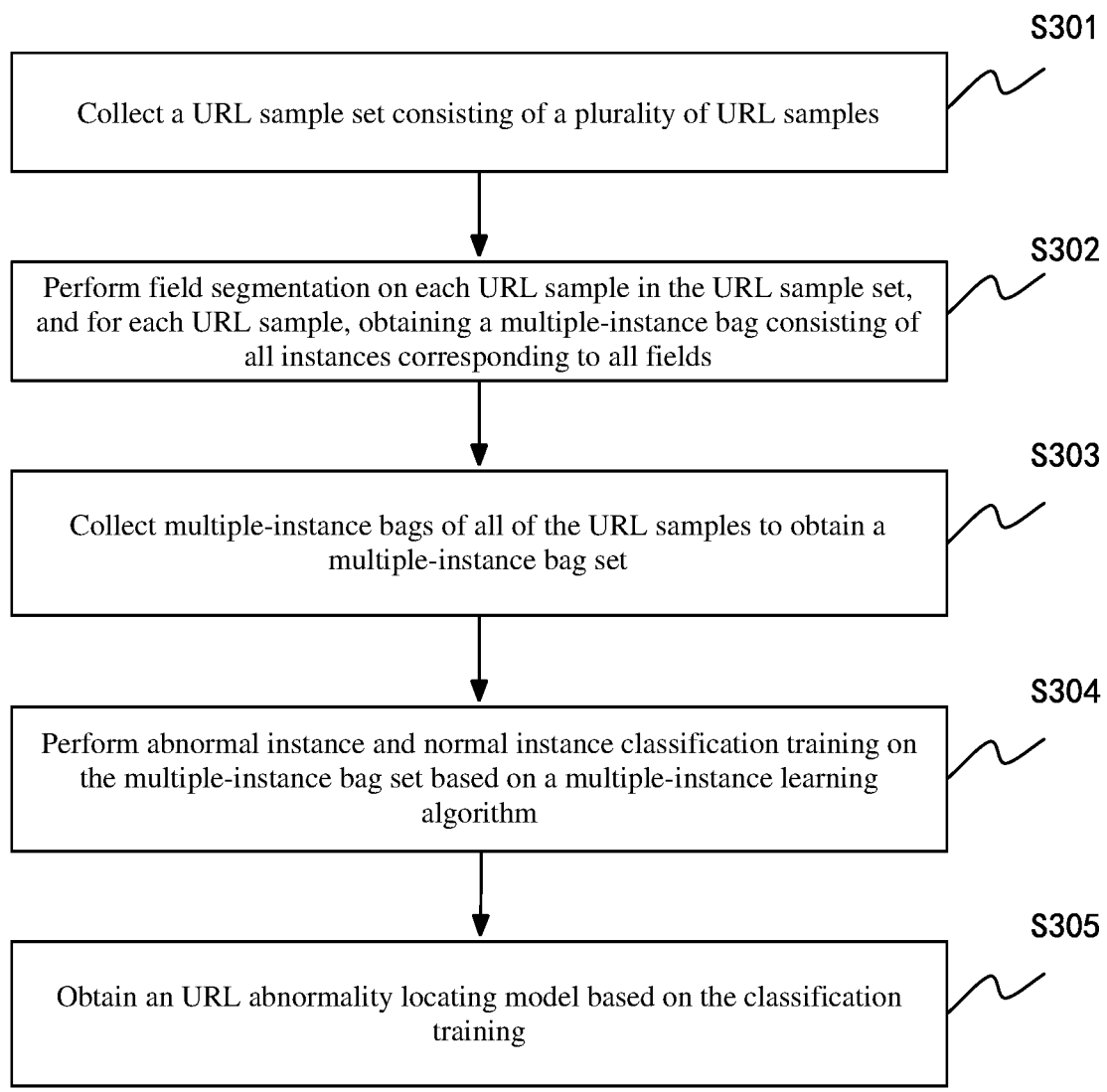
FIG. 3 is a flowchart of a URL abnormal field location training method, according to a second aspect of an embodiment of the specification.

In some embodiments, first, training is performed in advance based on a plurality of URL samples according to the multiple-instance learning algorithm to obtain the URL abnormal field location model (referring to FIG. 3 and related description for a training process). Next, a multiple-instance bag corresponding to a to-be-predicted URL is input into the URL abnormal field location model. According to the URL abnormal field location model, a value of an abnormality label of each instance in the multiple-instance bag are predicted, so that it is predicted that whether each instance in the multiple-instance bag is an abnormal instance.

In a traditional multiple-instance learning algorithm, a label is only given in a bag level. For example, for a standard multiple-instance learning, take a binary classification as an instance, provided that one of the instances of one bag is a positive instance, the bag is a positive bag. All instances in a negative bag are negative instances. It should be noted that a label of a bag is known, and a label of an instance is unknown. Therefore, compared with a traditional supervised learning, the multiple-instance learning has less supervised information and is more difficult.

In some embodiments, by giving labels of the instances, an abnormal instance and a normal instance (not limited to a bag-level label) are distinguished.

There is at least one positive instance in a positive bag. All instances in a negative bag are negative instances. In some embodiments, the so-called positive instance refers to an abnormal instance (for example, a value of an abnormality label being 1 or having a positive label), and the positive bag is also an abnormal bag. The so-called negative instance refers to a normal instance (for example, a value of the abnormality label being 0 or having a negative label), and the negative bag is also a normal bag.

S203. Locate a corresponding abnormal field according to the abnormal instance.

Because each instance is determined to correspond to a field, after the abnormal instance is predicted, an abnormal field corresponding to the abnormal instance may be determined, that is, an abnormal position in the URL may be determined.

In some embodiments, provided that one instance in one bag is positive, the bag is positive. All instances in a negative bag are negative. Therefore, provided that a multiple-instance bag corresponding to a URL includes one abnormal instance, the URL is determined to be an abnormal URL. If the multiple-instance bag corresponding to the URL includes no abnormal instance, the URL is determined to be a normal URL. Therefore, if it is determined that the URL has a corresponding abnormal instance, the URL may be determined to be an abnormal URL.

FIG. 3 is a flowchart of a URL abnormal field location training method according to a second aspect of an embodiment of the specification, including the following steps.

S301. Collect a URL sample set consisting of a plurality of URL samples. The URL sample set may be used as training data to train an URL abnormal field location model. The plurality of URL samples in the URL sample set may comprise a plurality of abnormal URL samples and a plurality of normal URL samples that are collected from historical data. In some embodiments, the plurality of abnormal URL samples and the plurality of normal URL samples may have been accurately labeled manually or automatically. In some embodiments, each of the plurality of URL samples comprises a plurality of fields.

S302. Perform field segmentation on each URL sample in the URL sample set, and for each URL sample, obtain a multiple-instance bag consisting of a plurality of instances corresponding to the plurality of fields in the URL sample. Each of the plurality of instances may be represented as a multi-dimensional feature vector. In the following description, an "instance" and a "feature vector" may be used interchangeably unless explicitly stated otherwise.

For example, a piece of URL original sample data may segmented to obtain a plurality of feature vectors representing the plurality of fields in the URL original sample. Different features may be extracted from each segmented field to represent the field with an instance (i.e., a feature vector). Finally, different instances of one URL are collected to be used as a bag.

S303. Collect multiple-instance bags of each URL sample to obtain a multiple-instance bag set.

S304. Based on the multiple-instance learning algorithm, perform an abnormal instance and normal instance classification training on the multiple-instance bag set.

In some embodiments, the instance classification training process learns a classifier that predicts an abnormality label for each instance in each bag. An abnormal instance and a normal instance are distinguished through values of abnormality labels of instances.

In some embodiments, a specific process of performing the abnormal instance and normal instance classification training on the multiple-instance bag set includes: initializing a value of an abnormality label (training label) for each instance in the multiple-instance bag set, and performing iterative learning of a classifier based on the training labels. The iterative learning process involves applying the classifier to make predictions, updating the training labels based on the predictions, optimizing the classifier, and repeating the process. In the following description, an "instance label" refers to a label of a field in a URL indicating whether the field is deemed abnormal or normal. The instance label may be positive (indicating abnormal) or negative (indicating normal). During training, the instance labels may be referred to as "training labels." The instance labels predicted by the classifier may be referred to as "predicted labels." The terms "instance label" and "abnormality label" may be used interchangeably.

Because an instance label is unobservable, a random value may be used to initialize it first, and then the instance label is iteratively updated during the training process. As training progresses, the instance labels of a URL sample are increasingly closer to a fact. Therefore, a model may be gradually trained to find a possible abnormal instance (harmful instance) in the training URL samples. The trained model may be used to predict a possible abnormal field of a future URL.

In particular, as previously described, there is at least one positive instance in a positive bag. All instances in a negative bag are negative instances. In some embodiments, the so-called positive instance refers to an abnormal instance (for example, a value of an instance label being 1 or having a positive label), and the positive bag is also an abnormal bag. The so-called negative instance refers to a normal instance (for example, a value of the instance label being 0 or having a negative label), and the negative bag is also a normal bag.

In some embodiments, the training process comprises an initialization phase and a training phase. The initialization phase may perform operations comprising: assigning a plurality of training labels to the plurality of feature vectors of each of the plurality of URL samples by: for each of the plurality of the abnormal URL samples, randomly selecting one or more of the plurality of feature vectors of the abnormal URL sample and assigning one or more positive training labels respectively to the one or more selected feature vectors; for each of the plurality of the normal URL samples, assigning a plurality of negative training labels respectively to the plurality of feature vectors of the normal URL sample. For example, during initialization, one or more instances (e.g., feature vectors) in a positive bag (e.g., an abnormal URL sample) are randomly selected to be assigned with positive training labels. The remaining instances in the positive bag are assigned with negative training labels. All instances in a negative bag (e.g., a normal URL sample) are provided with negative training labels.

Based on the initialization, each instance gets one training label. During the training phase, one classifier is trained according to the labeled instances (e.g., labeled feature vectors). An initial version of the classifier may be obtained in various ways, such as manual designed or randomly generated. All instances may be input into the classifier for classification. The results of the classification may include predicted labels for the instances. These predicted labels may be used to update the training labels of the instances. In some embodiments, the classifier also generates scores for its classification, where each score represents a confidence level (e.g., a probability) for generating the corresponding predicted label.

For example, a specific update process may include: training labels (all negative) of a negative bag keep unchanged, and for an instance in a positive bag, an training label is corrected according to a result of the classifier (e.g., a positive training label of a feature vector may be updated to be negative if the classifier yields a negative predicted label for the feature vector). Afterwards, a round of inspections is performed. That is to say, in response to the predicted labels for an abnormal URL sample being all negative, an instance that is of the instances with negative labels and that has a lowest score (that is, that is determined to have a lowest confidence degree in the negative instances) is selected to be provided with a positive label. In this way, update of the training labels is completed. An updated result becomes a new set of training data to train the classifier.

The above process is repeated, until the training labels of the instances between a previous round and a next round does not change.

It should be noted that the training labels are randomly provided at the beginning. During a classification training process, the training label are gradually corrected. The corrected training label then are used to train the classifier to be more accurate. Therefore, optimization is achieved.

S305. Based on classification training, determining the trained classifier as an URL abnormal field location model.

An embodiment of the specification is illustrated through a process of abnormality locating of a specific URL below.

For a normal URL, for example:
http://render.alipay.com/p/s/alipay_site/
wait?mintime=3&maxtime=5
&fromspanner=goldetfprod_502.

An attacker often performs an attack by correcting any possible part of the normal URL. In an actual service, because a domain name field (such as the foregoing: http://render.alipay.com) is basically fixed, only a parameter request part may be corrected, an attack often results from the parameter request part. In an example below, the attacker executes a script by manually correcting a normal URL.

For example, an abnormal URL instance is:
http://render.alipay.com/p/s/alipay_site/
wait?mintime=3>SCRiPT={Sleep}
&maxtime=5&fromspanner=goldetfprod_502

An abnormal field herein is "mintime=3>SCRiPT={Sleep}."

In traditional technical means, the URL is attempted to be uniformly represented. That is to say, each URL is represented in a form of a feature vector with a certain dimensionality. In this manner, an abnormal URL may be found, but an abnormal field in the foregoing instance cannot be accurately located. It is anticipated that the abnormal field may be accurately founded. Therefore, this method is intended to detect the abnormal field.

In particular, this problem is formalized as a problem of multiple-instance learning. During data acquisition, it may be often known which URLs are normal, and which are abnormal. This means that one URL label is in an entire URL level, and a problem of each field is often invisible. This just conforms to an assumption of the multiple-instance learning: In the multiple-instance learning, data is given in a form of a bag. One bag has a label and has a plurality of instances. An instance label is unknown. If one instance in one bag is a positive instance, the bag is a positive bag. If all instances are negative instances, the bag is a negative bag.

Still taking the foregoing normal URL as an example: through a segmentation of the URL, different sub-fields are obtained, that is, three instances of "mintime=3;" "Maxtime=5;" and "Fromspanner=goldetfprod_502" (values of the three instances are "3," "5," and "goldetfprod_502," respectively). One URL herein is one bag, and is represented to include three instances. Further, features of each field may be extracted and represented in various modes, such as a feature vector. For example, the features may include: a total number of characters, a total number of letters, a total number of digits, a total number of symbols, a number of different characters, a number of different letters, a number of different digits, and a number of different symbols in the instance. Therefore, three feature vectors in the bag in the foregoing instance may be expressed as [1,0,1,0,1,0,1,0], [1,0,1,0,1,0,1,0], and [15,11,3,1,13,9,3,1]. Because the URL is a normal URL, a label of the bag is negative (that is, a normal URL).

Similarly, for the foregoing corrected abnormal URL, an abnormal instance may be identified through a model. A corresponding abnormal field (abnormal sub-field), that is, "SCRiPT={Sleep}," may be determined through the abnormal instance. Therefore, abnormal analysis and abnormal precaution are facilitated.

In some embodiments, when the URL is represented as a bag consisting of a plurality of instances corresponding to a plurality of fields, an abnormal instance is predicted by using a URL abnormal field location model, so as to locate an abnormal field in the URL. By multiple-instance learning-based URL abnormal field location, an undiscovered potential threat in data accessed every day can be well predicted.

Because an abnormality may be determined for an abnormal URL, a great support may be provided for discovering the potential threat, building a new security rule, and establishing a security system.

Figure 4:
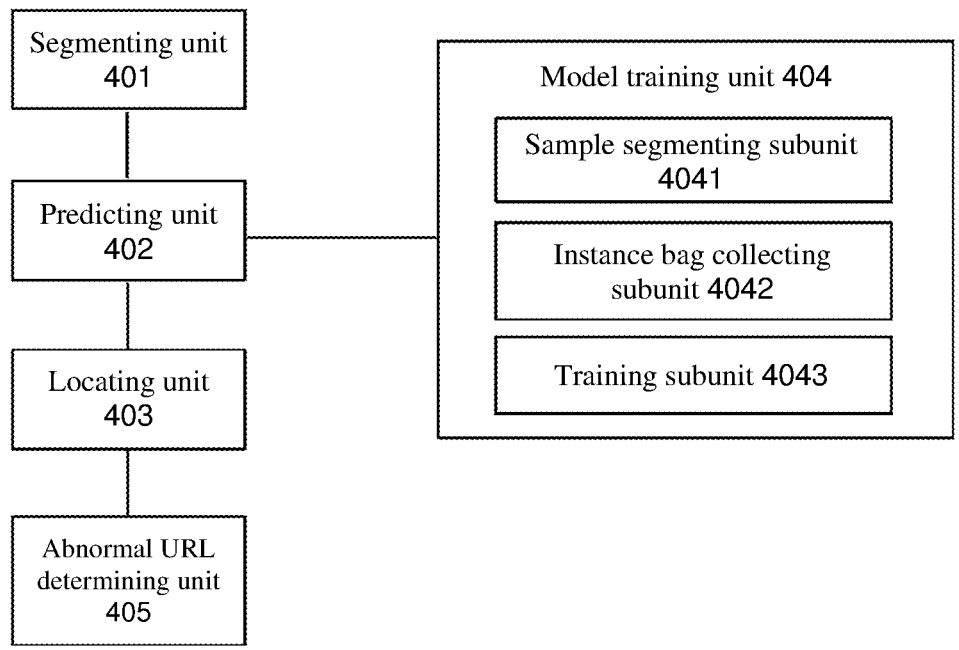
FIG. 4 is a schematic structural diagram of a URL abnormal field location device, according to a third aspect of an embodiment of the specification.

In a third aspect, based on a same inventive concept, an embodiment of the specification provides a URL abnormal field location device. Referring to FIG. 4, the URL abnormal field location device includes: a segmenting unit 401 configured to perform field segmentation on a URL to obtain a multiple-instance bag consisting of all instances corresponding to all fields; a predicting unit 402 configured to input the multiple-instance bag into a preset URL abnormal field location model to predict an abnormal instance; and a locating unit 403 configured to locate a corresponding abnormal field according to the abnormal instance.

In some embodiments, the URL abnormal field location device further includes: a model training unit 404 configured to train a plurality of URL samples based on a multiple-instance learning algorithm, to obtain the URL abnormal field location model.

In some embodiments, the model training unit 404 includes: a sample segmenting subunit 4041 configured to perform field segmentation on each URL sample in the URL sample set, and for each URL sample, obtain a multiple-instance bag consisting of all instances corresponding to all fields; an instance bag collecting subunit 4042 configured to collect multiple-instance bags of all of the URL samples to obtain a multiple-instance bag set; and a training subunit 4043 configured to perform an abnormal instance and normal instance classification training on the multiple-instance bag set based on the multiple-instance learning algorithm, so as to obtain the URL abnormal field location model.

In some embodiments, an abnormal instance and a normal instance are distinguished through values of abnormality labels of instances.

The training subunit 4043 is specifically configured to: initialize a value of an abnormality label of each instance in the multiple-instance bag set, and perform iterative learning on the value of the abnormality label to update a final value of the abnormality label of each instance.

In some embodiments, the predicting unit 402 is specifically configured to: predict the value of the abnormality label of each instance in the multiple-instance bag according to the URL abnormal field location model, so as to determine whether each instance is an abnormal instance.

In some embodiments, the URL abnormal field location device further includes: an abnormal URL determining unit 405 configured to determine whether the URL is an abnormal URL: if an instance bag corresponding to the URL includes an abnormal instance, determine that the URL is the abnormal URL; and if the instance bag corresponding to the URL includes no abnormal instance, determine that the URL is a normal URL.

In some embodiments, the instances are represented by feature vectors of corresponding fields.

In some embodiments, the field is a parameter request field in the URL.

Figure 5:
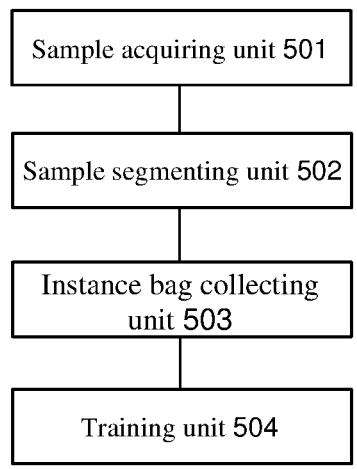
FIG. 5 is a schematic structural diagram of a URL abnormal field location training device, according to a fourth aspect of an embodiment of the specification.

In a fourth aspect, based on a same inventive concept, an embodiment of the specification provides a URL abnormal field location training device. Referring to FIG. 5, the URL abnormal field location training device includes: a sample acquiring unit 501 configured to collect a URL sample set consisting of a plurality of URL samples; a sample segmenting unit 502 configured to perform field segmentation on each URL sample in the URL sample set, and for each URL sample, obtain a multiple-instance bag consisting of all instances corresponding to all fields; an instance bag collecting unit 503 configured to collect multiple-instance bags of all of the URL samples to obtain a multiple-instance bag set; and a training unit 504 configured to perform an abnormal instance and normal instance classification training on the multiple-instance bag set based on the multiple-instance learning algorithm, so as to obtain the URL abnormal field location model.

In some embodiments, an abnormal instance and a normal instance are distinguished through values of abnormality labels of instances.

The training unit 504 is specifically configured to: initialize a value of an abnormality label of each instance in the multiple-instance bag set, and perform iterative learning on the value of the abnormality label to update a final value of the abnormality label of each instance.

Figure 6:
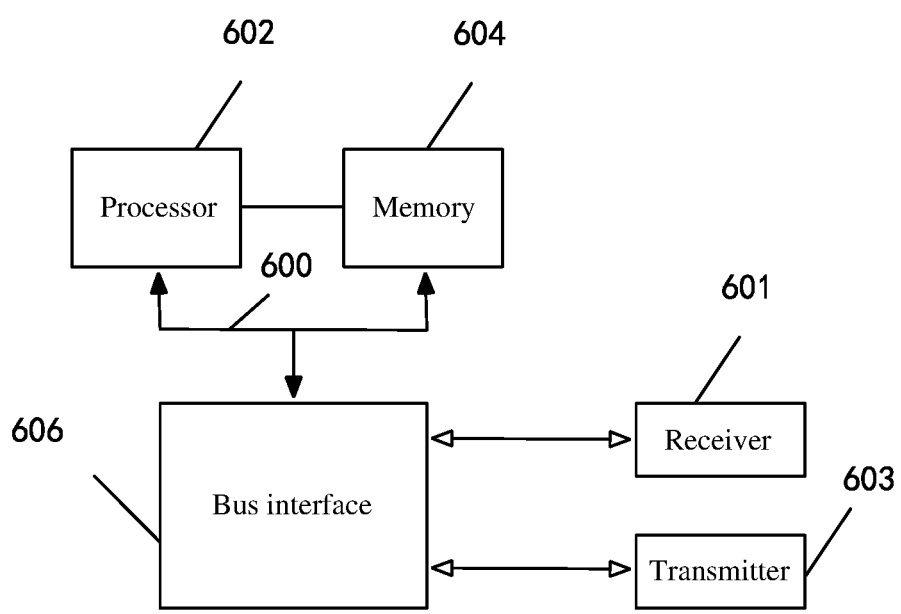
FIG. 6 is a schematic structural diagram of a URL abnormal field location server, according to a fifth aspect of an embodiment of the specification.

In a fourth aspect, based on the same invention concept as the URL abnormal field location methods in the foregoing embodiments, the present application further provides a server, as shown in FIG. 6, including a memory 604, a processor 602, and a computer program stored in the memory 604 and executed on the processor 602, when being executed by the processor 602, the program implementing the steps of any one of the URL abnormal field location methods.

In FIG. 6, in a bus architecture (represented by a bus 600), the bus 600 may include any quantity of interconnected buses and bridges, and the bus 600 connects various circuits including one or more processors represented by a processor 602 and memories represented by a memory 604. The bus 600 may further connect various other circuits such as a peripheral device, a voltage stabilizer, and a power management circuit. These are known in the art, and therefore are not further described in the specification. A bus interface 606 provides an interface between the bus 600 and a receiver 601 and a transmitter 603. The receiver 601 and the transmitter 603 may be a same element, that is, a transceiver, providing a unit configured to communicate with various other apparatuses on a transmission medium. The processor 602 is responsible for management of the bus 600 and normal processing, and the memory 604 may be configured to store data used when the processor 602 performs an operation.

In a sixth aspect, based on the same inventive concept as the URL abnormal field location methods in the foregoing embodiments, the present application further provides a computer-readable storage medium, storing a computer program, when being executed by a processor, the program implementing the steps of any one of the URL abnormal field location methods.

This specification is described with reference to the flowchart and/or block diagram of the method, device (system), and computer program product of the embodiments of the specification. It should be understood that computer program instructions can implement each procedure and/or block in the flowcharts and/or block diagrams and a combination of procedures and/or blocks in the flowcharts and/or block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction device. The instruction device implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

Although the exemplary embodiments of the specification have been described, persons skilled in the art may make alterations and modifications to these embodiments once persons skilled in the art learn the basic inventive concept. Therefore, the appended claims are intended to be construed as including the exemplary embodiments and all alterations and modifications falling within the scope of the specification.

Apparently, persons skilled in the art may make various modifications and variations to the specification without departing from the spirit and scope of the specification. If these modifications and variations of the specification belong to the scope of the claims of the specification and equivalent technologies thereof, the specification is also intended to cover these modifications and variations.

What is claimed is:

1. A URL abnormal field locating method, comprising:
   obtaining a plurality of URL samples comprising a plurality of abnormal URL samples and a plurality of normal URL samples, wherein each of the plurality of URL samples comprises a plurality of fields;
   for each of the plurality of URL samples, obtaining a plurality of feature vectors representing the plurality of fields of the URL sample;
   assigning a plurality of training labels to the plurality of feature vectors of each of the plurality of URL samples by:
      for each of the plurality of the abnormal URL samples, randomly selecting one or more of the plurality of feature vectors of the abnormal URL sample and assigning one or more positive training labels respectively to the one or more selected feature vectors;
      for each of the plurality of the normal URL samples, assigning a plurality of negative training labels respectively to the plurality of feature vectors of the normal URL sample; and
   obtaining, based on a classifier, a plurality of predicted labels for the plurality of feature vectors of each of the plurality of URL samples;
   updating the plurality of training labels based on the plurality of predicted labels;
   training the classifier with the plurality of updated training labels; and
   deploying the trained classifier to identify an abnormal field in a URL.

2. The method of claim 1, wherein the randomly selecting one or more of the plurality of feature vectors of the abnormal URL sample and assigning one or more positive training labels respectively to the one or more selected feature vectors comprises:
   assigning a negative training label to each of the plurality of feature vectors that are not selected.

3. The method of claim 1, wherein each of the plurality of feature vectors comprises at least one of following features of the corresponding field: a total number of characters, a total number of alphabets, a total number of digits, and a total number of symbols.

4. The method of claim 1, wherein the updating the plurality of training labels based on the plurality of predicted labels comprises:
   keeping the plurality of training labels for each of the plurality of normal URL samples unchanged; and
   updating the plurality of training labels for each of the plurality of abnormal URL samples according to the plurality of predicted labels for the abnormal URL sample.

5. The method of claim 4, wherein the obtaining a plurality of predicted labels for the plurality of feature vectors of each of the plurality of URL samples based on a classifier comprises:
   by classifying each of the plurality of feature vectors of the URL sample, the classifier generates the plurality of predicted labels for the plurality of feature vectors and a plurality of corresponding scores, each score indicating a probability of a corresponding classification; and
   the updating the plurality of training labels based on the plurality of predicted labels comprises:
   in response to the plurality of predicted labels for the abnormal URL sample being all negative, selecting one of the plurality of vector features of the abnormal URL sample corresponding to the predicted label with a lowest score; and
   updating the plurality of training labels for the abnormal URL sample by assigning a positive training label to the selected vector feature of the abnormal URL sample.

6. The method of claim 1, wherein the training the classifier with the plurality of updated training labels comprises:
   training the classifier until the plurality of training labels are unchanged after being updated based on the plurality of predicted labels.

7. The method of claim 1, wherein the training the classifier with the plurality of updated training labels comprises:
   training the classifier based on a multiple-instance learning algorithm.

8. The method of claim 1, wherein the deploying the trained classifier to identify an abnormal field in a URL comprises:
   obtaining a plurality of feature vectors corresponding to a plurality of fields in the URL;
   inputting the plurality of feature vectors into classifier to predict a plurality of labels for the plurality of fields in the URL; and
   locating one or more abnormal fields in the URL according to the plurality of abnormality labels for the URL.

9. The method of claim 1, wherein the plurality of fields of the URL sample comprise a parameter request field in the URL sample.

10. A system comprising a processor and a non-transitory computer-readable storage medium storing instructions executable by the processor to cause the system to perform operations comprising:
    obtaining a plurality of URL samples comprising a plurality of abnormal URL samples and a plurality of normal URL samples, wherein each of the plurality of URL samples comprises a plurality of fields;

for each of the plurality of URL samples, obtaining a plurality of feature vectors representing the plurality of fields of the URL sample;
assigning a plurality of training labels to the plurality of feature vectors of each of the plurality of URL samples by:
for each of the plurality of the abnormal URL samples, randomly selecting one or more of the plurality of feature vectors of the abnormal URL sample and assigning one or more positive training labels respectively to the one or more selected feature vectors;
for each of the plurality of the normal URL samples, assigning a plurality of negative training labels respectively to the plurality of feature vectors of the normal URL sample; and
obtaining, based on a classifier, a plurality of predicted labels for the plurality of feature vectors of each of the plurality of URL samples;
updating the plurality of training labels based on the plurality of predicted labels;
training the classifier with the plurality of updated training labels; and
deploying the trained classifier to identify an abnormal field in a URL.

11. The system of claim 10, wherein the randomly selecting one or more of the plurality of feature vectors of the abnormal URL sample and assigning one or more positive training labels respectively to the one or more selected feature vectors comprises:
assigning a negative training label to each of the plurality of feature vectors that are not selected.

12. The system of claim 10, wherein the updating the plurality of training labels based on the plurality of predicted labels comprises:
keeping the plurality of training labels for each of the plurality of normal URL samples unchanged; and
updating the plurality of training labels for each of the plurality of abnormal URL samples according to the plurality of predicted labels for the abnormal URL sample.

13. The system of claim 12, wherein the obtaining a plurality of predicted labels for the plurality of feature vectors of each of the plurality of URL samples based on a classifier comprises:
by classifying each of the plurality of feature vectors of the URL sample, the classifier generates the plurality of predicted labels for the plurality of feature vectors and a plurality of corresponding scores, each score indicating a probability of a corresponding classification; and
the updating the plurality of training labels based on the plurality of predicted labels comprises:
in response to the plurality of predicted labels for the abnormal URL sample being all negative, selecting one of the plurality of vector features of the abnormal URL sample corresponding to the predicted label with a lowest score; and
updating the plurality of training labels for the abnormal URL sample by assigning a positive training label to the selected vector feature of the abnormal URL sample.

14. The system of claim 10, wherein the training the classifier with the plurality of updated training labels comprises:
training the classifier until the plurality of training labels are unchanged after being updated based on the plurality of predicted labels.

15. The system of claim 10, wherein the deploying the trained classifier to identify an abnormal field in a URL comprises:
obtaining a plurality of feature vectors corresponding to a plurality of fields in the URL;
inputting the plurality of feature vectors into classifier to predict a plurality of labels for the plurality of fields in the URL; and
locating one or more abnormal fields in the URL according to the plurality of abnormality labels for the URL.

16. A non-transitory computer-readable storage medium configured with instructions executable by one or more processors to cause the one or more processors to perform operations comprising:
obtaining a plurality of URL samples comprising a plurality of abnormal URL samples and a plurality of normal URL samples, wherein each of the plurality of URL samples comprises a plurality of fields;
for each of the plurality of URL samples, obtaining a plurality of feature vectors representing the plurality of fields of the URL sample;
assigning a plurality of training labels to the plurality of feature vectors of each of the plurality of URL samples by:
for each of the plurality of the abnormal URL samples, randomly selecting one or more of the plurality of feature vectors of the abnormal URL sample and assigning one or more positive training labels respectively to the one or more selected feature vectors;
for each of the plurality of the normal URL samples, assigning a plurality of negative training labels respectively to the plurality of feature vectors of the normal URL sample; and
obtaining, based on a classifier, a plurality of predicted labels for the plurality of feature vectors of each of the plurality of URL samples;
updating the plurality of training labels based on the plurality of predicted labels;
training the classifier with the plurality of updated training labels; and
deploying the trained classifier to identify an abnormal field in a URL.

17. The storage medium of claim 16, wherein the randomly selecting one or more of the plurality of feature vectors of the abnormal URL sample and assigning one or more positive training labels respectively to the one or more selected feature vectors comprises:
assigning a negative training label to each of the plurality of feature vectors that are not selected.

18. The storage medium of claim 16, wherein the updating the plurality of training labels based on the plurality of predicted labels comprises:
keeping the plurality of training labels for each of the plurality of normal URL samples unchanged; and
updating the plurality of training labels for each of the plurality of abnormal URL samples according to the plurality of predicted labels for the abnormal URL sample.

19. The storage medium of claim 18, wherein the obtaining a plurality of predicted labels for the plurality of feature vectors of each of the plurality of URL samples based on a classifier comprises:
by classifying each of the plurality of feature vectors of the URL sample, the classifier generates the plurality of predicted labels for the plurality of feature vectors and a plurality of corresponding scores, each score indicating a probability of a corresponding classification; and the updating the plurality of training labels based on the plurality of predicted labels comprises:

in response to the plurality of predicted labels for the abnormal URL sample being all negative, selecting one of the plurality of vector features of the abnormal URL sample corresponding to the predicted label with a lowest score; and updating the plurality of training labels for the abnormal URL sample by assigning a positive training label to the selected vector feature of the abnormal URL sample.

20. The storage medium of claim 18, wherein the training the classifier with the plurality of updated training labels comprises:

training the classifier until the plurality of training labels are unchanged after being updated based on the plurality of predicted labels.

\* \* \* \* \*